United States Patent Office 3,265,468
Patented August 9, 1966

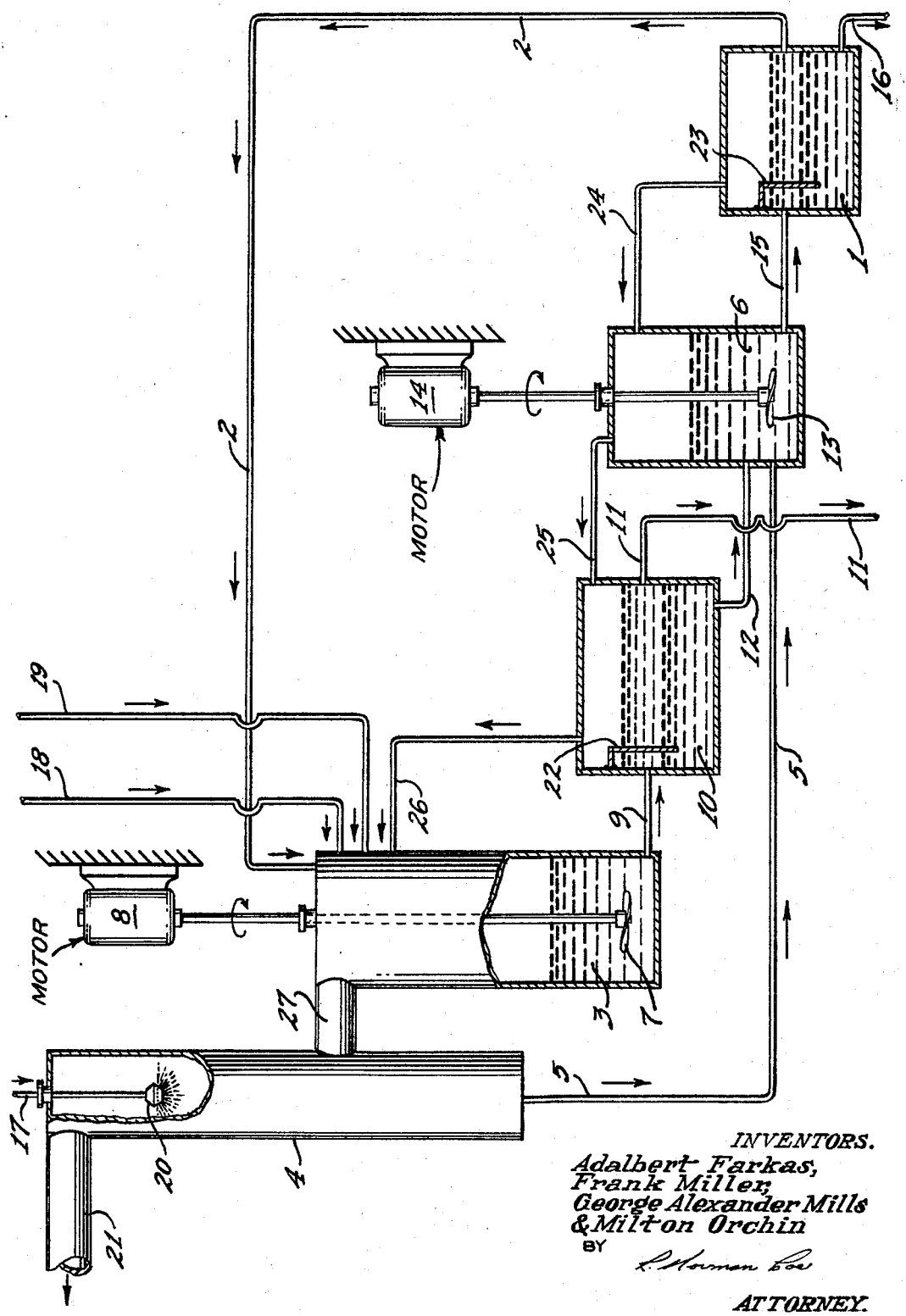

3,265,468
PROCESS FOR FORMING DICOBALT OCTACARBONYL
Adalbert Farkas, Media, Pa., Frank Miller, Wilmington, Del., George Alexander Mills, Swarthmore, Pa., and Milton Orchin, Cincinnati, Ohio, assignors to Air Products and Chemicals, Inc., Philadelphia, Pa., a corporation of Delaware and Tidewater Oil Company, Los Angeles, Calif., a corporation of Delaware
Filed Apr. 22, 1963, Ser. No. 274,467
5 Claims. (Cl. 23—203)

The present invention relates to a process for forming dicobalt octacarbonyl, and more particularly to a process for forming dicobalt octacarbonyl in high yield.

Dicobalt octacarbonyl [$Co_2(CO)_8$] is one of the known starting materials for the production of cobalt hydrocarbonyl, a useful hydroformylation catalyst. Dicobalt octacarbonyl itself may be employed as a catalyst for the dimerization of 2-norbornene. Other known uses for dicobalt octacarbonyl include the treatment of pine wood to produce a paper product high in cellulose content. It has also been suggested that carbonyls of cobalt may be added to gasoline to effect a coating of engine cylinders in order to reduce octane requirements.

In accordance with the present invention, dicobalt octacarbonyl is obtained from aqueous solutions of alkali or alkaline earth metal carbonyls of cobalt with recoveries of at least 80% of the total cobalt contained in the aqueous starting material. Hereinafter it will be understood that when the term alkali is used either alkali or alkaline earth metals are contemplated. One convenient source of the aqueous starting solution is obtained from an Oxo process disclosed in French Patent 1,223,381, wherein carbonyl compounds of cobalt are washed in the presence of carbon monoxide and hydrogen with a dilute aqueous solution of an alkali compound, such as dilute sodium carbonate solution.

In the practice of the present invention, an aqueous solution of an alkali metal carbonyl of cobalt is acidified with an acid such as sulfuric and then subjected to liquid-liquid extraction with a solvent. Reactions involved in conversion of aqueous sodium cobalt carbonyl solution to dicobalt octacarbonyl are shown by the following equations:

(1) $Na^+ + Co(CO)_4^- + H^+ \rightleftharpoons HCo(CO)_4 + Na^+$
(2) $2HCo(CO)_4 \rightarrow Co_2(CO)_8 + H_2$ The liberation of the hydrocarbonyl in the presence of water probably stabilizes the anion by solvation and permits the decomposition to occur smoothly to the desired products, $Co_2(CO)_8 + H_2$.

Under the specified conditions, the possibility of hydrocarbonyl decomposing to carbonyls containing a carbon monoxide to cobalt ratio of less than 4 such as $HCo(CO)_3$ and $[Co(CO)_3]_4$ is suppressed.

It has been found necessary, in the practice of the present invention, to remove any dissolved aldehydes present in the aqueous starting solution prior to acidification and extraction. In a preferred embodiment of the invention this is accomplished by solvent extraction with a material such as toluene. One stage is generally sufficient for this operation. For brevity, the solution which has undergone this pre-extraction is referred to as "aldehyde-free" aqueous solution.

In the preferred embodiment, the acidification step is accomplished by acidifying the aforementioned aldehyde-free aqueous solution at room temperature with an amount of 6 N $H_2SO_4$ corresponding to approximately twice the equivalents of alkali metal present in the solution. It is essential that 1 to 4 mols of acid be employed for the acidification step per alkali equivalent in the solution. The acidified solution is then immediately extracted in at least one stage with toluene.

During the extraction step, carbon dioxide is released from the aqueous solution. In addition, hydrogen evolution commences as soon as an appreciable concentration of cobalt hydrocarbonyl builds up in the toluene layer. The total hydrogen released in the conversion of the hydrocarbonyl to the octacarbonyl amounts to 0.5 mol per mol of cobalt hydrocarbonyl extracted. Because of the high vapor pressure of $HCo(CO)_4$ (760 mm at 10° C.) some $HCo(CO)_4$ could be lost with this $CO_2$ and $H_2$ unless special precautions are taken. Gaseous cobalt hydrocarbonyl present in the vented $CO_2$ and $H_2$ is extracted by scrubbing the gases with toluene used for extraction.

Suitable apparatus for such extraction is shown by the drawing which is a schematic sketch of equipment for the extraction of aldehyde-free aqueous solution with toluene.

In the drawing, aldehyde-free aqueous sodium cobalt carbonyl solution, 6 N sulfuric acid and toluene from settling zone 1 are pumped through lines 18, 19 and 2, respectively into the chamber above mixing zone 3. Sufficient free space above the liquid layer is provided for gas evolution ($CO_2$ and some $H_2$). The gases leave said chamber through toluene scrubber 4 in which entrained cobalt hydrocarbonyl is removed from the gas stream and is returned with the toluene by line 5 to mixing zone 6.

Stirrer 7, driven by motor 8, agitates the liquid in zone 3 before said liquid is conveyed by line 9 to settling zone 10, where stratification occurs. The upper layer in zone 10, containing toluene and dicobalt octacarbonyl, is removed by means of line 11 for washing and drying (not shown).

The lower layer in zone 10 is an aqueous layer. This lower layer is fed through line 12 into mixing zone 6 which is agitated by stirrer 13 driven by motor 14. Toluene, containing minor amounts of cobalt hydrocarbonyl, is introduced through line 5 into mixing zone 6.

The material in zone 6 is then transmitted through line 15 to settling zone 1 where stratification again occurs with toluene in the upper layer. This toluene is recycled to mixing zone 3. The lower aqueous layer is removed by line 16 and discarded.

While toluene, the aldehyde-free aqueous sodium cobalt carbonyl solution and sulfuric acid may be introduced at various stages during the extraction, typically they are added by lines 17, 18 and 19, respectively. Moreover, toluene is preferably introduced in the form of a spray through nozzle 20 located at the top of scrubber 4 and near vent 21.

Liquid may be transmitted from one zone to the next in the apparatus shown by the drawing either at set intervals, continuously, or partially by both means. Baffles 22 and 23 prevent contamination of the upper layers in zones 10 and 1, respectively, from the solution transferred by lines 9 and 15. Gas generated in the various zones is permitted to escape through lines 24, 25, 26 and 27 and is finally vented through vent 21.

Dicobalt octacarbonyl obtained from line 11 may contain minor impurities which can be removed by washing with water free from dissolved oxygen ("oxygen-free" water).

The washed dicobalt octacarbonyl product (toluene extract) is then dried by suitable means, such as 2–4 mm. beads of silica gel, either by agitation with the drying agent or filtration through a bed of the drying agent.

While the present invention has been described with reference to the use of sulfuric acid for the acidification and toluene for the extraction, other mineral acids may be employed for said acidification and aromatic hydrocarbons as well as lower alkanes are useful for said extraction. Other such acids include those having a dissociation constant larger than $10^{-2}$; e.g., nitric, hydrochloric and hydrobromic acid. Typical solvents include $C_5$–$C_{12}$ alkanes, such as pentane, hexane, decane, etc.; $C_6$ to $C_{10}$ aromatic hydrocarbons such as benzene, xylene and liquid alkyl naphthalenes; cycloparaffinic solvents such as cyclohexane and methylcyclohexane; carbon tetrachloride and chloroform.

The invention is further clarified by reference to the following examples. All the manipulations and operations with solutions containing cobalt carbonyls were carried out in these examples under a nitrogen blanket.

EXAMPLE I

Sodium cobalt carbonyl solution having a composition as set forth in Table 1 was withdrawn in the amount of 1300 ml. and extracted three times under a nitrogen blanket with 460 ml. portions of fresh reagent grade toluene for preliminary removal of dissolved oxygenated products from the $NaCo(CO)_4$.

Table 1

| | |
|---|---|
| Co, g./l. | 13.5 |
| $Co(CO)_4^-$, g./l. | 39.0 |
| $NaCo(CO)_4$, mol/l. | 0.23 |
| $Na_2CO_3$, mol/l. | 0.005 |
| $NaHCO_3$, mol/l. | 0.07 |

Four separate runs were made with a mixture of 200 ml. of the extracted aqueous solution and 200 ml. of toluene. The mixtures were stirred at 10° C. while varying amounts of 6 N sulfuric acid (14, 21, 28 and 42 ml.) were added in the respective runs.

The aqueous and toluene layers were allowed to stand before they were separated. The toluene layer for each run was washed with 50 ml. of distilled water freed of gas by boiling and saturated with nitrogen. The toluene layer was then drained and dried with anhydrous calcium sulfate pellets. The cobalt (present as $Co_2(CO)_8$) recovered in the toluene extract phase was 82.5%, 88.1%, 89.6% and 90.7%, respectively, for the four runs. This cobalt analysis of the toluene solution was obtained by conversion of the dicobalt octacarbonyl to cobaltous ion with iodine solution as described in H. W. Sternberg, et al., Anal. Chem. 24 No. 1, p. 174 (1952), followed by an extraction with HCl. The combined aqueous extracts were gravimetrically analyzed for $Co^{++}$.

EXAMPLE II

The procedure of Example I was followed with the following exceptions: the acidifications and extractions were done at ambient temperature, 30 ml. of toluene rather than 200 ml. was used for the extraction after acidification, the toluene and aqueous layers were separated after shaking and without being allowed to stand for any extended length of time and the product was not washed with water before being dried. In addition, 35 ml. of 6 N sulfuric acid was added in the third run rather than 28 ml. of acid as employed in the comparative run made in Example I.

The cobalt recovered as dicobalt octacarbonyl in the toluene extract phase amounted to 55.2%, 69.6%, 76.3% and 78.8%, respectively, for the four runs.

EXAMPLE III

The composition of the aqueous carbonate cobalt solution for this example is shown by the following table:

Table 2

| | |
|---|---|
| Co, g./l. | 12.1 |
| $Co(CO)_4^-$, g./l. | 35.0 |
| $NaCo(CO)_4$, mol/l. | 0.21 |
| $Na_2CO_3$, mol/l. | } 0.08 |
| $NaHCO_3$, mol/l. | |

In this example to separate acidifications were done; their extracts were combined. In each acidification, 8 liter portions of the aqueous carbonate solution were extracted at ambient temperature with ⅓ of its volume of nitration grade toluene. After separation from the toluene, the combined extracts were placed in a stirred reaction vessel under nitrogen. 1.2 liters of reagent grade toluene were added to the vessel. With vigorous stirring, 1.2 liters of 8.5 N sulfuric acid were then slowly added to the vessel. After all of the acid had been added, stirring was continued for 5 minutes and the lower aqueous layer separated from the black toluene supernatant layer. The toluene layer was then collected and washed with two successive 55 ml. portions of oxygen-free water. The product was then dried by shaking with two 80 gm. portions of 2 to 4 mm. beads of silica gel.

The product was analyzed by the gasometric procedure. It was also found to be free from cobalt hydrocarbonyl. Recovery of cobalt from the aqueous alkaline solution was 84%.

Obviously, many modifications and variations of the invention hereinbefore set forth may be made without departing from the spirit and scope thereof, and therefore only such limitations should be imposed as are indicated in the appended claims.

What is claimed is:

1. A cyclic process for forming dicobalt octacarbonyl, which comprises acidifying an aldehyde-free aqueous solution of an alkali metal carbonyl of cobalt with 1 to 4 mols of a mineral acid having a dissociation constant larger than $10^{-2}$ for each alkali equivalent present in solution to obtain cobalt hydrocarbonyl, adding a solvent for cobalt carbonyl compounds involved in the process to the acidified solution, said solvent selected from the group consisting of $C_5$ to $C_{12}$ alkanes and $C_6$ to $C_{10}$ aromatic hydrocarbons, effecting stratification in a first settling zone of the resulting solution into an aqueous lower layer and a solvent upper layer, recovering the aforesaid solvent upper layer containing dicobalt octacarbonyl formed by the decomposition of cobalt hydrocarbonyl, effecting liquid-gas extraction with additional aforesaid solvent to recover cobalt hydrocarbonyl from gases generated by the process, combining the aqueous lower layer from the first settling zone with the solvent solution employed for extraction of process generated gases, effecting stratification of the combined aqueous-solvent solution in a second settling zone to obtain an upper layer of the solvent employed in the extraction of process generated gases and an aqueous lower layer, recovering the upper layer from the second settling zone and recycling the recovered upper layer for use as a solvent added to the acidified solution.

2. The process of claim 1 wherein the dicobalt octacarbonyl recovered with the solvent from the first settling zone is water washed and thereafter dried with solid water absorbent material.

3. The process of claim 1 wherein the mineral acid is sulfuric acid.

4. The process of claim 1 wherein the mineral acid is hydrochloric acid.

5. A cyclic process for forming dicobalt octacarbonyl, which comprises acidifying an aldehyde-free aqueous solution of an alkali metal carbonyl of cobalt with 1 to 4 mols of sulfuric acid for each alkali equivalent present in solution to obtain cobalt hydrocarbonyl, adding toluene to the acidified solution, effecting stratification in a first settling zone of the resulting solution into an aqueous lower layer and a toluene upper layer, recovering the toluene upper layer containing dicobalt octacarbonyl formed by the decomposition of cobalt hydrocarbonyl, effecting liquid-gas extraction with additional toluene to recover cobalt hydrocarbonyl from gases generated by the process, combining the aqueous lower layer from the first settling zone with the toluene solution employed for extraction of process generated gases, effecting stratification of the combined aqueous-toluene solution in a second settling zone to obtain an upper layer of the toluene employed in the extraction of process generated gases and an aqueous lower layer, recovering the upper layer from the second settling zone and recycling the recovered upper layer for use as the toluene added to the acidified solution.

References Cited by the Examiner

UNITED STATES PATENTS 2,865,716 12/1958 Hasek -------------- 23—203
2,985,504 5/1961 Orchin -------------- 23—14

FOREIGN PATENTS 1,223,381 6/1960 France.

OTHER REFERENCES

Blanchard: "The Volatile Metal Carbonyls," Chemical Reviews, vol. 21, No. 1 (August 1937), pp. 3–38.

Gilmont et al.: "DiCobalt Octacarbonyl, Cobalt Nitrosyl Tricarbonyl and Cobalt Tetracarbonyl Hydride," Inorganic Syntheses, vol. 2, pages 238–243.

Handbook of Chemistry and Physics, 44th edition, pages 1754–1757, reprint 1962, Chemical Rubber Publishing Co.

Reppe et al.: "Carbonylation," Chemical Abstracts, vol. 48, col. 11312d–11313.

OSCAR R. VERTIZ, *Primary Examiner.*

MAURICE A. BRINDISI, BENJAMIN HENKIN,
*Examiners.*

O. F. CRUTCHFIELD, B. H. LEVENSON,
*Assistant Examiners.*